April 29, 1930.  F. H. JONES  1,756,428
CLUTCH
Filed Jan. 19, 1925   5 Sheets-Sheet 1
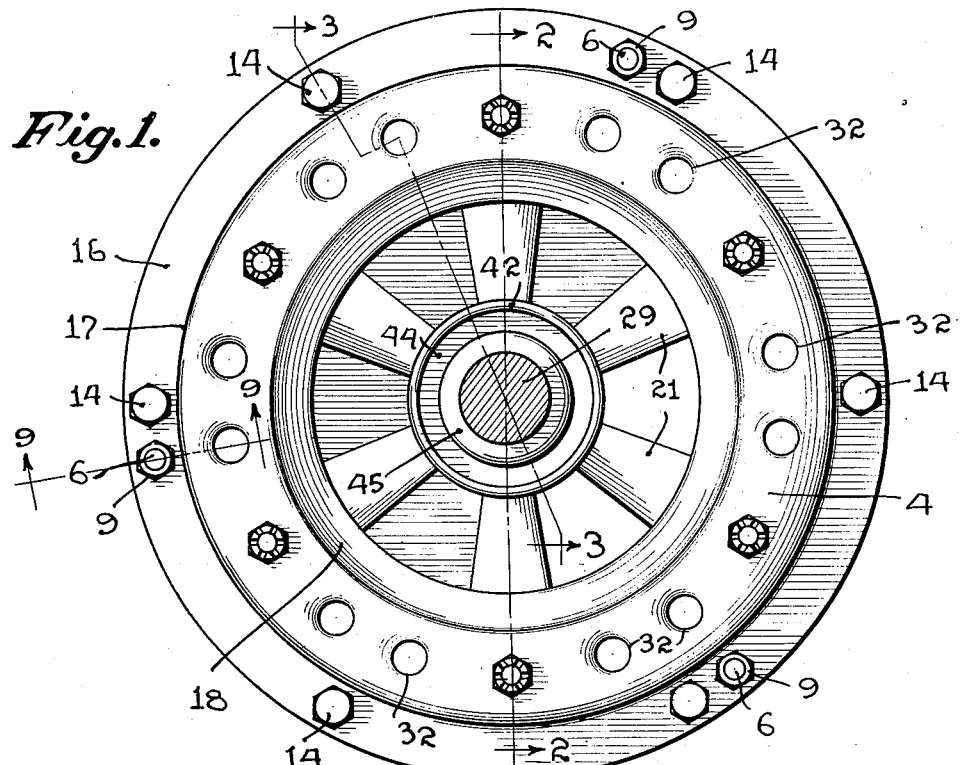
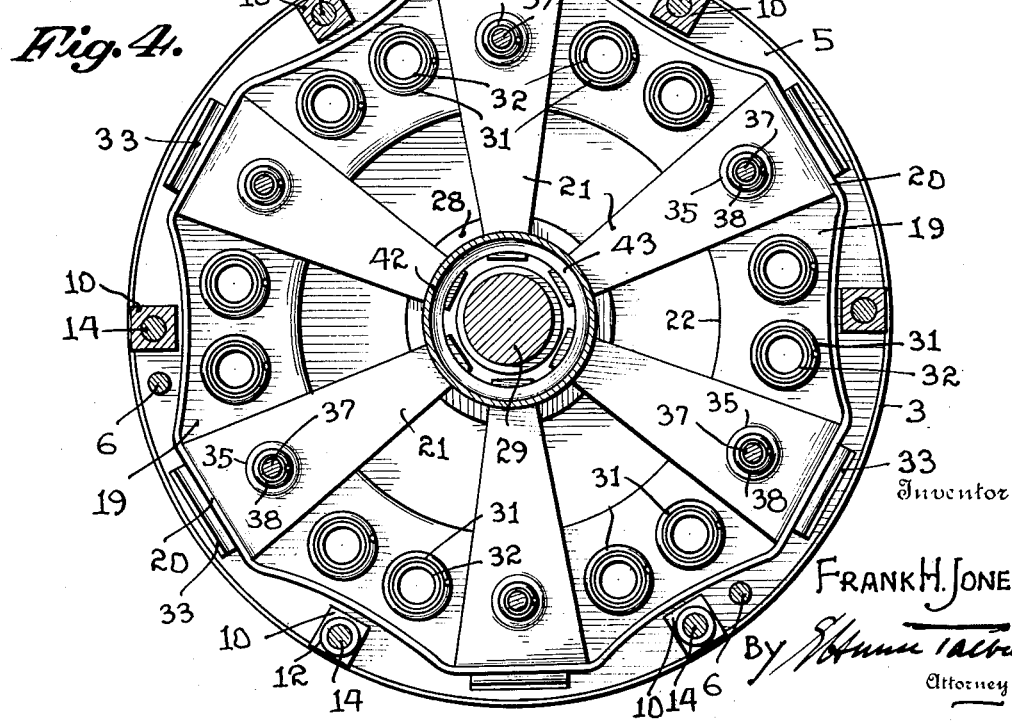
Inventor
FRANK H. JONES
By
Attorney April 29, 1930.  F. H. JONES  1,756,428
CLUTCH
Filed Jan. 19, 1925  5 Sheets-Sheet 2

Inventor
FRANK H. JONES.
Attorney

April 29, 1930. F. H. JONES 1,756,428
CLUTCH
Filed Jan. 19, 1925 5 Sheets-Sheet 3
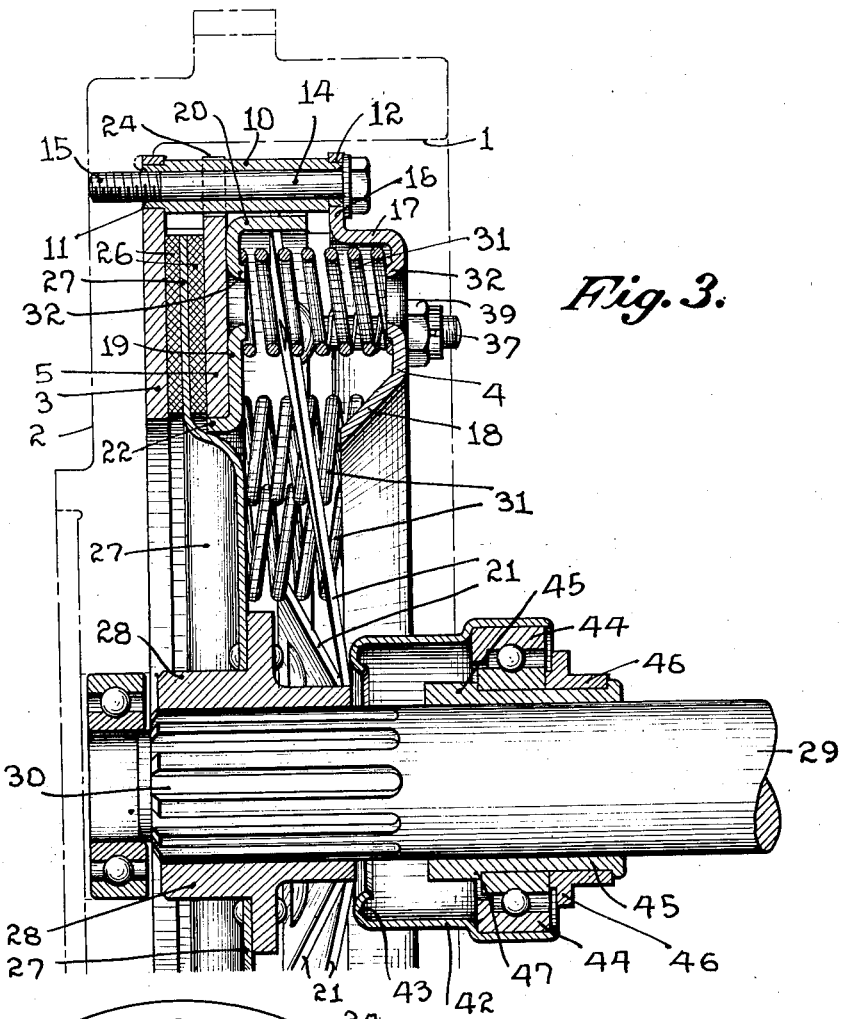
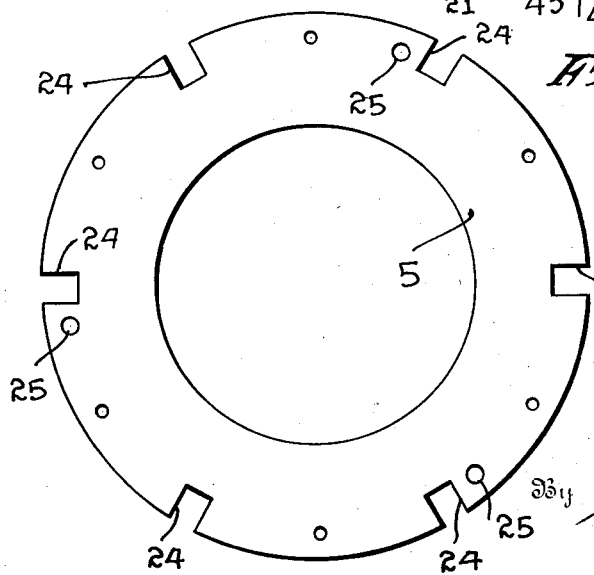
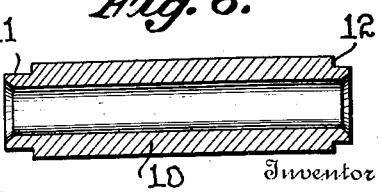
Inventor
FRANK H. JONES.
Attorney Inventor
FRANK H. JONES.

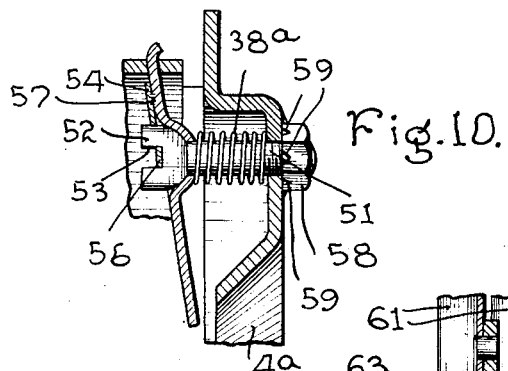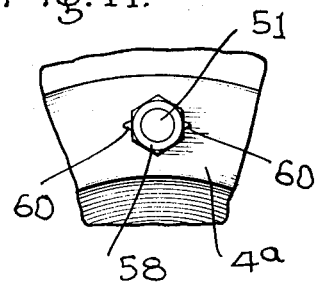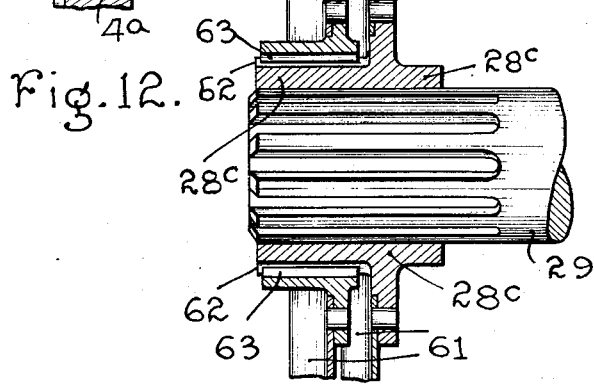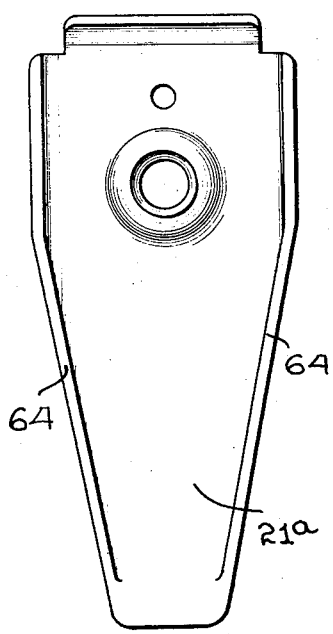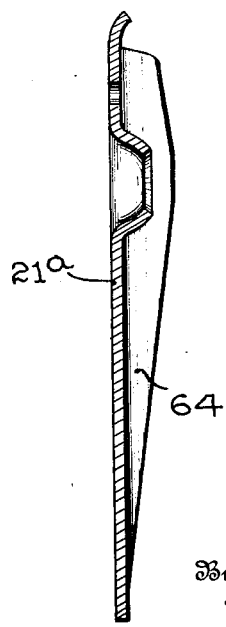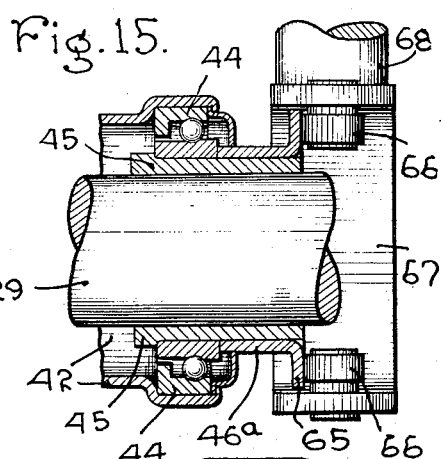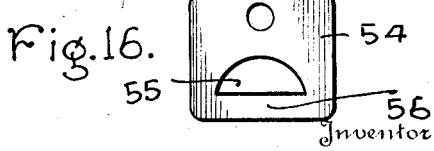

Patented Apr. 29, 1930

1,756,428

UNITED STATES PATENT OFFICE

FRANK H. JONES, OF CLEVELAND, OHIO, ASSIGNOR TO ALLEN B. WHITNEY AND FRANK H. JONES, BOTH OF UPPER SANDUSKY, OHIO

CLUTCH

Application filed January 19, 1925. Serial No. 3,390.

The purpose of the invention is to provide a clutch of the type particularly adaptable for use in connection with motor-driven vehicles in which the number of parts required will be reduced to a minimum and assembled in a compact manner, with the parts susceptible of production almost throughout by stamping processes; to provide a clutch construction of the push-in release type in which the fulcrum of the clutch pedal is disposed below the clutch center, thus providing for increased leverage at the clutch pedal with the result that the pressure necessary to effect release is reduced to a minimum, therefore giving a softer pedal pressure; to provide a simplified construction of assembly and means for attachment to the driving unit, such as the motor fly wheel; and to provide a simplified adjustment for varying the friction of the cooperating driving and driven elements so that the necessary adjustment to take up for wear on these elements may be made with facility.

With these and other purposes in view, the invention consists in a construction and combination of parts of which a preferred embodiment is illustrated in the accompanying drawings, wherein:

Figure 1 is an elevational view of the invention looking at the rear face of the same.

Figure 3 is a sectional view on the plane indicated by the line 3—3 of Figure 1.

Figure 4 is a transverse elevational sectional view on the plane indicated by the line 4—4 of Figure 2.

Figure 5 is a plan view of the pilot plate.

Figure 6 is a detail sectional view of one of the posts.

Figure 10 is a detail sectional view of a modified form of mounting for the release lever supporting bolts.

Figure 11 is a detail plan view illustrating a modification of the outer plate to provide locks for the nuts of the supporting bolts.

Figure 12 is a detail sectional view illustrating a modified form of mounting of the disks of the dual form illustrated in Figure 8.

Figures 13 and 14 are respectively plan and central longitudinal sectional views of the modified form of release lever.

Figure 15 is a plan view of a modified form of actuating means.

Figure 16 is a plan view of a release lever bolt retainer.

Figures 2, 9:
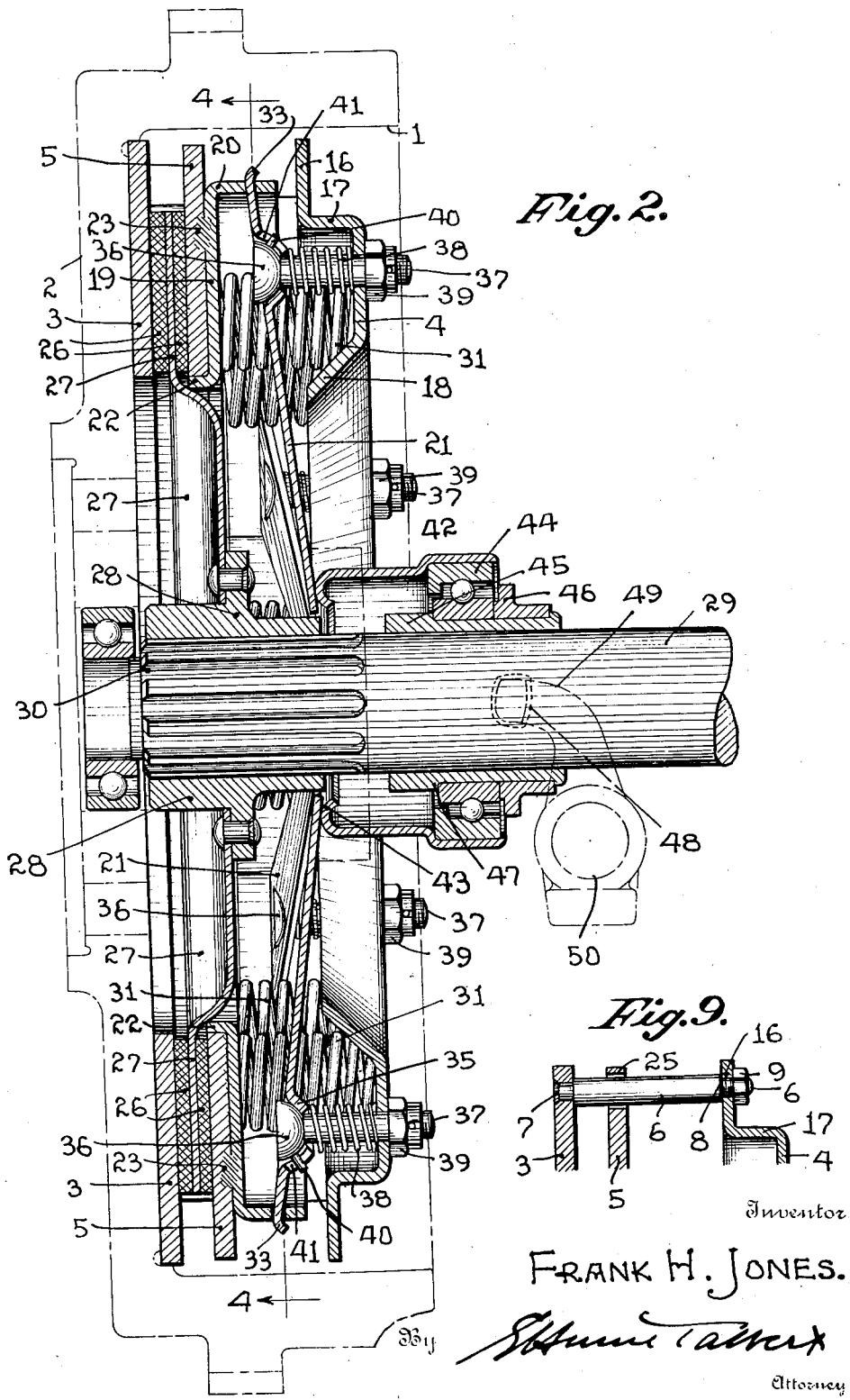
Figure 2 is a central diametrical sectional view on the plane indicated by the line 2—2 of Figure 1.
Figure 9 is a detail sectional view on the plane indicated by the line 9—9 of Figure 1.

The clutch is designed to be carried in the pocket 1 of the motor fly wheel 2 mounted in the usual manner on the driving shaft of the motor, not necessary of illustration here. It embodies an inner base or retaining plate 3 and an outer retaining plate 4 interposed between which there is a pilot plate 5. The plates are all preferably of annular form and the inner plate 3 is provided with retaining studs 6 disposed adjacent its periphery and secured to the plate, preferably by reducing them at their extremities and passing them through appropriate eyes on the base plate for riveting over the rear face of the latter, as indicated at 7, the studs at the opposite extremities being reduced to provide shoulders 8 against which the outer plate 4 rests and against which said outer plate is secured by means of nuts 9 engaged with said threaded extremities and abutting the plate 4 on the outer face. The retaining studs serve as spacers for the inner and outer plates but in addition to these there are provided the guide posts 10 which are preferably cross sectionally angular or square.

The posts 10 are reduced, as indicated at 11, to provide necks entering eyes formed in the inner plate 3 and are peaned over against the latter. Thus, the posts are permanently secured to the inner plate but the reduced extremities 12 constitute necks loosely entering eyes in the outer plate 4. The posts are bored longitudinally for the reception of the clutch attaching bolts 14, the heads of which bear against the outer plate 4. The inner threaded extremities of said bolts threadingly engage the fly wheel, as indicated at 15. The strain imposed by the attaching bolts is thus met by the posts 10 and there is, therefore, no tendency to distort the plates in attaching the device to the fly wheel.

The outer plate 4 is preferably a stamping formed to provide a peripheral flange 16 and a channel portion 17, the inner bounding wall 18 of which is arranged at an angle to the bottom of the channel and constitutes a stop for the clutch actuating levers, as hereinafter appears. The heads of the bolts 14 bear on the flange 16 as well as the nuts 9 and the flange is offset inwardly from the bottom wall of the channel.

The pilot plate 5 which is of annular form, as aforesaid, carries the pressure release plate 19, the periphery of which is of sinuous form and bounded by a continuously extending rearwardly directed flange 20, said flange at uniformly spaced points being straight to provide ears for engagement by the release lever plates 21. At the inner periphery, the pressure plate is formed with a forwardly extending flange 22 engaging the inner periphery of the pilot plate or disk 5 and the two are preferably secured together by spot welding them, as indicated at 23.

The pilot plate 5 is provided with radial recesses 24 on its periphery at points corresponding to the positions of the posts 10 and with recesses 25 corresponding to the positions of the assembly studs 6, the side surfaces of the posts 10 parallel with the radius being machined to provide reduced bearing surfaces for the pilot plate and the recesses 25 being of a size to permit free movement of the plate on the assembly studs.

Figure 8:
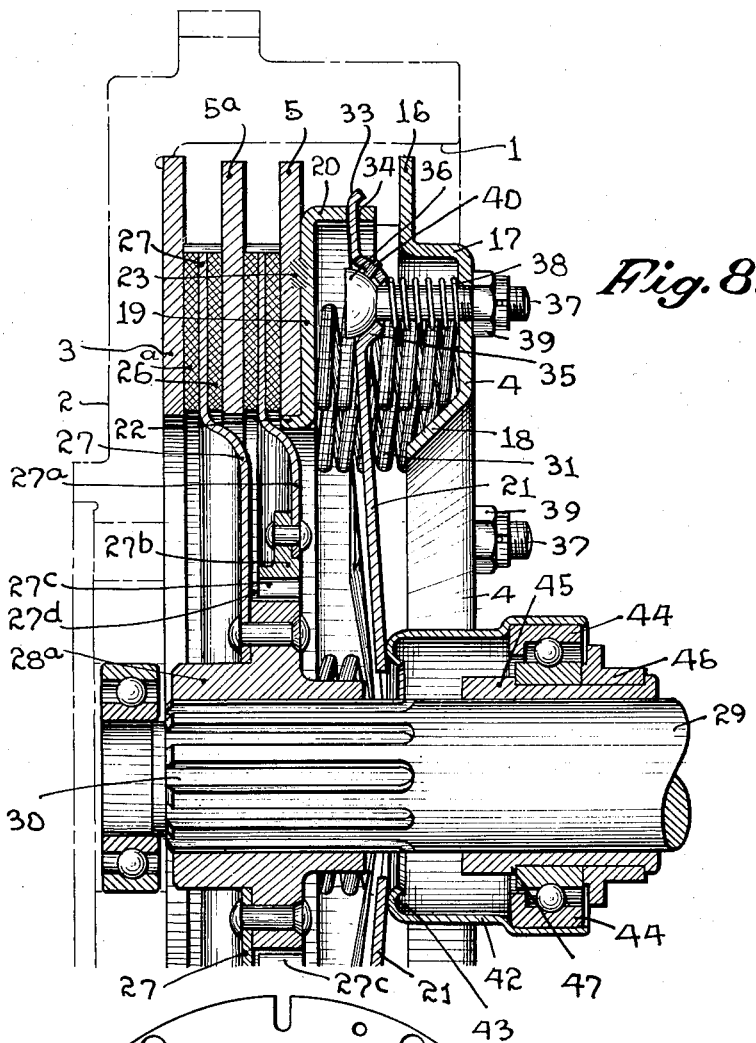
Figure 8 is a view similar to that shown in Figure 3 but illustrating a modification.
Figure 7:
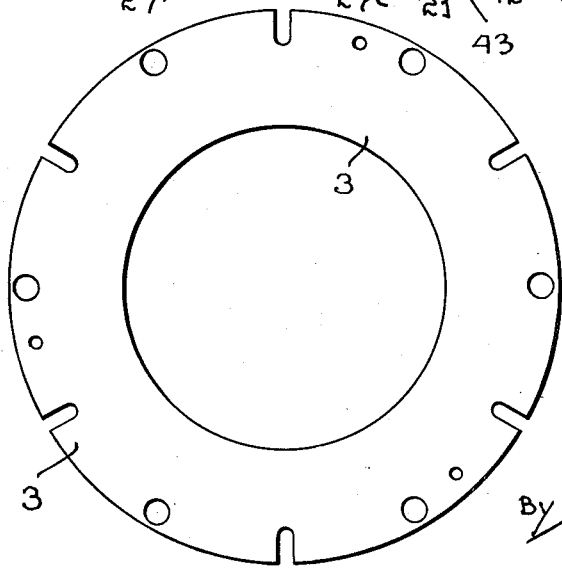
Figure 7 is a plan view of the inner retaining or base plate.

Interposed between the plates 3 and 5 are friction rings 26 disposed respectively on opposite sides of a friction disk 27 riveted or otherwise secured to a hub 28 mounted for sliding movement on the driven shaft 29 to which it is splined, as indicated at 30, to preclude relative angular or turning movement between it and the shaft. If desired, the friction elements may be increased in number, as indicated in Figure 8, and in such case an additional friction disk 27ª is employed, but instead of being provided with a hub is equipped centrally with a ring 27ᵇ, the inner periphery of which is toothed, as indicated at 27ᶜ, for engagement with teeth 27ᵈ on the hub 28ª.

The friction rings 26ª are disposed on opposite sides of the two friction disks but interposed between adjacent friction rings 26ª is a supplemental pilot plate 5ª peripherally slotted for sliding engagement with the posts 10 and studs 6. The friction disks, whether in single or multiple form, are positively connected to the driven shaft 29 and if the pilot plate be forced into contact with the friction rings with sufficient pressure, frictional engagement between the fly wheel carried parts and the friction disks will result, with the consequent rotation of the driven shaft in correspondence with the driving shaft which in the present instance is the engine or motor shaft.

In order to provide for the necessary pressure to effect the frictional engagement desired, the compression springs 31 are employed. These springs are arranged in pairs uniformly spaced and bear at one end in the channel of the outer plate 4 and at the other end against the pressure release plate. In order to retain these springs in position, both the pressure release plate and the outer retaining plate have bosses 32 entering the extremities of the springs and these bosses are preferably of annular form, being formed by punching holes in the plates and raising a peripheral bead around the holes.

While the springs 31 provide the necessary pressure to effect engagement between the driving and driven parts of the device, the means for their disengagement consists of the release levers 21, these being preferably stamped from flat stock and of the generally triangular form shown, with the outer ends offset, as at 33, to constitute hook elements engaging the slots 34 in the ears of flange 20. The release levers are radially disposed, and in the zone of the channel 17 they are punched to provide cups 35 for the reception of hemispherical heads 36 of bolts 37, the shanks of the latter being encircled by compression springs 38 compressed between the levers and the outer plate 4. Castle nuts 39 are engaged with the bolts 37 and bear against the outer face of the outer retaining plate and constitute the adjusting means by which the extent of the bolts laterally from the channel may be regulated.

In order to preclude turning movement of the bolts, keys 40 are carried in the heads and engage slots 41 in the cups 35. The heads of the bolts 37 constitute the fulcrums for the release levers and if the inner extremities are pushed in the direction of the fly wheel, the pressure release plate is moved toward the outer plate 4 against the pressure of the springs 31. Thus, the driving and driven elements of the device are released.

In order to provide for the oscillatory movement of the release levers, the inner ends of the same bear on the forward extremity of a sleeve 42 turned inwardly, as indicated at 43, to provide a rounded edge for engagement with the release levers. The sleeve is frictionally engaged with the rotary or removable element of a ball bearing 44 carried by a drag sleeve 45 mounted on the driven shaft 29. The bearing is secured on the drag sleeve by a hardened collar 46, retaining it against a shoulder 47 on the drag sleeve. The collar on its diametrically opposite sides is socketed, as indicated at 48, for the reception of the extremities of the arms of the fork 49 secured for oscillatory movement on a transverse shaft 50 with which the clutch release pedal is connected.

The sleeve 42 and its component parts has no direct connection with any members of the clutch except when the latter is mounted on the fly wheel with the driven shaft in position. When the clutch is dismounted, therefore, it is essential to provide some means to prevent the release levers swinging around loosely since they will then be not engaged by the sleeve 42. The inturned flange 18 of the outer plate constituting the inner wall of the channel then acts as an abutment to be engaged by the release levers since the pressure of the springs 31 will force the pressure release plate 19 away from the outer cover plate 4, thus rocking the inner ends of the levers toward the outer cover plate where they will finally engage the flange 18 frictionally and thus will not be permitted to hang loose.

In Figure 10, there is illustrated a modified form of mounting for the release lever supporting bolts. In this form, the bolts 51 have their heads 52 transversely slotted, as at 53. To preclude angular or turning movement, retainers 54 are provided, these being in the form of plates punched as indicated at 55 in Figure 16 to provide a transverse web portion 56 resting in the slot 53. The plates are retained on the release levers by any acceptable means, preferably by spot welding, as indicated at 57. The nuts 58 which engage the outer or rear ends of the bolts 51 are notched on the under faces, as indicated at 59, these notches being of V form for engagement with struck-up transversely triangular ribs 60 formed in the outer plate 4ª which, except for the formation of these ribs, is identical with the plate 4 shown in the other forms. The springs 38ª used with the bolts 51 are identical with the springs 38 and permit yielding axial movement of the bolts in the adjustment of the latter, thus permitting the nut to ride over the ribs 60 until the selected adjustment is secured when the notches 59 are engaged by the ribs and the nut precluded from further turning. This construction, it will be noted, provides, after adjustment has once been made, against any relative turning movement of the nut and bolt.

In Figure 12 is illustrated a modification of the mounting of the friction disks, where a plurality of such are employed. The disks 61 in this construction are of identical form and dimensions, the one being carried by the hub 28ᶜ provided with a toothed portion 62 simulating a gear for engagement with the internal teeth 63 of the hub of the other disk. The teeth 62 and 63 are formed on the same pitch line and consequently no relative angular or turning movement of the hubs is permitted but axial movement is and accordingly the hub portion provided with teeth 63 may be moved relative to the hub 28ᶜ to permit the engagement of the other friction disk 61 with its complemental friction rings. In the multiple disk form, if the outer hub be connected to the rear disk, as the hub 27ᵇ in Figure 8, rather than to the forward disk as in Figure 12, the releasing operation is much more smoothly effected, there then being no tendency for the forward disk to hang and tend to keep the clutch elements in engagement.

In the modified form of release levers shown in Figures 13 and 14, the levers 21ª are formed to resist all strains tending to bend the same, such strains being restricted by the lateral flanges 64 formed by turning up the stock at the side edges.

In the modified actuating means illustrated in Figure 15, the collar 46ª, instead of being socketed as in the other form, is formed with a peripheral flange 65 at the rear end, this flange constituting the bearing surface for rolls 66 carried by arms of the forks 67 designed to be oscillated by the foot lever connected with a transverse shaft 68.

The invention having been described, what is claimed as new and useful is:

1. A clutch comprising cooperating friction members adapted for mounting respectively on driving and driven members, a pressure release plate, an outer retaining plate disposed adjacent the pressure release plate, pressure springs interposed between the former and the latter, the pressure release plate being provided with ears having slots formed therein, pivotally mounted levers having turned extremities engaging said slots and constituting pivotal connections between the levers and the release plate, and means for rocking the levers to impart movement to the release plate against the pressure of said pressure springs.

2. A clutch comprising inner and outer plates of which the latter is in the form of a stamping shaped to provide a peripheral channel of which the outer bounding wall is provided with a peripheral flange and the inner bounding wall disposed at an angle to the bottom thereof, connecting means between the plates engaged with the flange of said outer plate, cooperating friction members of which some are adapted for mounting on a driven shaft and the others operatively connected with the connecting means between the plates, a pressure release plate connected with one of said remaining friction members, release levers pivotally mounted on said outer plate and having terminal pivotal connections with said release plate, springs seated in the channel of said outer plate and bearing upon said release plate, and a member movable toward and away from the inner ends of said release levers to effect rocking movement of the same, the inner peripheral edge of said inclined bounding wall acting as an abutment stop for said levers in movement in one direction.

3. A clutch comprising inner and outer plates and interposed spacers, cooperating friction members of which some are adapted for mounting on a driven shaft and the remainder slidingly engaged with said spacers, a pressure release plate secured to one of said friction members and provided with a peripheral flange, studs carried by the outer plate and provided with hemispherical heads, release levers loosely mounted on said studs and formed with depressions embracing said hemispherical heads, said release levers comprising stampings of which the outer ends extend through slots in the flange of said pressure release plate and the inner ends extend inwardly toward the axes of said inner and outer plates, an actuating member engaging the inner ends of said levers, and compression springs disposed between the pressure release plate and the outer plate and bearing upon the same, both the latter having means for terminal connection with the springs to prevent lateral movement of the latter.

4. A clutch comprising inner and outer plates and interposed spacers, cooperating friction members of which some are adapted for mounting on a driven shaft and the remainder slidingly engaged with said spacers, a pressure release plate secured to one of said friction members and provided with a peripheral flange, studs carried by the outer plate and provided with hemispherical heads, release levers loosely mounted on said studs and formed with depressions embracing said hemispherical heads, said release levers comprising stampings of which the outer ends extend through slots in the flange of said pressure release plate and the inner ends extend inwardly toward the axes of said inner and outer plates, an actuating member engaging the inner ends of said levers, compression springs disposed between the pressure release plate and the outer plate and bearing upon the same, and springs in surrounding relation to the studs and compressed between the release levers and the outer plate.

5. A clutch comprising inner and outer plates and interposed spacers, cooperating friction members of which some are adapted for mounting on a driven shaft and the remainder slidingly engaged with said spacers, a pressure release plate secured to one of said friction members and provided with a peripheral flange, studs carried by the outer plate and provided with hemispherical heads, release levers loosely mounted on said studs and formed with depressions embracing said hemispherical heads, said release levers comprising stampings of which the outer ends extend through slots in the flange of said pressure release plate and the inner ends extend inwardly toward the axes of said inner and outer plates, an actuating member engaging the inner ends of said levers, compression springs disposed between the pressure release plate and the outer plate and bearing upon the same, and springs in surrounding relation to the studs and compressed between the release levers and the outer plate, the hemispherical heads of the studs having keys engaged in slots in said levers and the studs extending through the outer plate and having threaded extremities and nuts engaged upon the same and bearing against the outer face of the outer plate.

6. A clutch comprising driving and driven elements of which the latter embodies a shaft, a hub movable axially of said shaft but precluded from angular or turning movement with respect thereto, a second hub surrounding the first and movable axially of the latter but precluded from relative angular or turning movement, a disk carried by each hub, and friction elements carried by the driving member and engageable with said disks, the disk on the outer hub element being to the rear of the disk on the inner hub.

In testimony whereof he affixes his signature.

FRANK H. JONES.